Patented Aug. 27, 1935

2,012,922

UNITED STATES PATENT OFFICE 2,012,922

BRONZING LIQUID

Charles Bogin and Vaughn Kelly, Terre Haute, Ind., assignors to Commercial Solvents Corporation, Terre Haute, Ind., a corporation of Maryland No Drawing. Application January 18, 1930, Serial No. 421,870

10 Claims. (Cl. 134—79)

Our invention relates to improvements in bronzing lacquers having a nitrocellulose base. More specifically, our invention relates to an improved type of bronzing lacquer not subject to the usual defect of rapid gelling.

A bronzing lacquer consists essentially of a suspension of bronze powder in a nitrocellulose solution or "bronzing liquid". The usual solvent mixtures are employed in these bronzing liquids, and nitrocellulose of the high viscosity or "bronzing cotton" type is usually used, although cotton of lower viscosity may also be employed. Gums and plasticizers are added in some cases to improve the adhesion of the film to the under surface, and to improve its elasticity. The bronze powder is usually not added to this mixture during its preparation, but is stirred into the finished liquid just before it is desired to use the lacquer. The reason for this procedure is the tendency of all bronzing lacquers to form gels shortly after the admixture of the bronze powder. The life of the lacquer, e. g., the length of time before gelling occurs depends upon the concentration and type of bronze used, the grade of cotton, the strength of the solvent mixture, and other factors. In general, however, gel formation takes place in less than ten days, and usually in from two hours to two days. The entire lacquer will gel if the bronze has remained suspended, but if it has settled the gel will be formed only at the bottom in the vicinity of the bronze powder. This gel, although often soluble in additional strong solvents, in a great many cases cannot be dispersed by further addition of the usual solvent mixtures or by any mechanical means. For this reason, the tendency to form such gels obviously detracts from the usefulness of bronzing lacquers.

Although no adequate explanation has previously been offered for this phenomenon, a number of preventative agents have been recommended to overcome it. The failure of such agents to accomplish their purpose is evident from the fact that none is in use at the present time. Some, such as sodium carbonate, not only have no beneficial action but have been found by us to be in reality detrimental and tend to cause gel formation. Others, although capable of preventing gelling, possess other disadvantages which make their use impractical.

We have now found the difficulties previously experienced may be overcome by using as the preventative agent such materials as lactic acid, either in the form of the free acid, or in the form of its salts, such as, for example, its alkali salts, or its esters such as, for example, the ethyl, butyl or benzyl lactates. The lactic radical is a powerful inhibiting agent, preventing gelling in certain cases if employed in as small amounts as 0.05% of the total weight of the bronzing liquid. In general, an addition of 0.3% to 1.0% of lactic acid, or a corresponding amount of the lactate products mentioned above will prevent gelling for considerable lengths of time. We have found in laboratory tests, using various types of bronzing liquids and a wide variety of bronzes, that those in which 0.4% lactic acid was incorporated did not gel in most instances in sixty days or longer, and in no case in less than fifteen days. The bronzing liquids containing no preventative, on the other hand, gelled in two days in most instances.

The bronzing lacquers in which lactic acid or other suitable lactic acid derivatives can be satisfactorily used as the anti-gel agent may be of any of the usual types. The nitrocellulose may be the ½ second or 4 second type, or a high viscosity cotton such as 40 or 70 seconds bronzing cotton. The usual plasticizers, such as dibutyl phthalate, castor oil, or lindol may be used. Gums such as dammar, ester gum, elemi, or synthetic resins may be incorporated in the lacquers. The bronze powder may be the various copper-zinc alloys, mixtures of such powders, or such powders with pigments or dyes incorporated in them. These powders are usually mixed with a little thinner and then added to the finished bronzing liquid. The bronze is added in proportions which may vary over a wide range, depending upon the particular type of lacquer desired. For 100 parts of nitrocellulose, 10 to 1,000 parts or more of bronze powder may be used. However, 100 to 200 parts are satisfactory for most purposes. The solvent mixtures usually used contain esters, alcohols, hydrocarbons, and, if desired, carbonyl compounds or ethers. Esters such as ethyl acetate, butyl acetate or butyl propionate, carbonyl compounds such as furfural, acetone, or diacetone alcohol, and ethers such as the monoethyl ether of ethylene glycol or the

ficient to deleteriously affect the composition as a whole.

7. A nitrocellulose bronzing lacquer containing an alkali salt of lactic acid in an amount sufficient to prevent gelling of the composition and not sufficient to deleteriously affect the composition as a whole.

8. A nitrocellulose bronzing lacquer containing as gel preventative 0.05% to 1.0% of a lactic acid ester.

9. A nitrocellulose bronzing lacquer containing as gel preventative 0.05% to 1.0% of an aliphatic ester of lactic acid.

10. A nitrocellulose bronzing lacquer containing as gel preventative 0.05%–1.0% of at least one material selected from the group consisting of lactic acid, esters of lactic acid, and salts of lactic acid.

CHARLES BOGIN.
VAUGHN KELLY.